United States Patent
Van Nieuwenhoven et al.

(10) Patent No.: US 6,633,515 B1
(45) Date of Patent: Oct. 14, 2003

(54) METHOD FOR STORING AUDIO-CENTERED INFORMATION

(75) Inventors: Marcel S. E. Van Nieuwenhoven, Eindhoven (NL); Johannes J. Mons, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/328,023

(22) Filed: Jun. 8, 1999

(30) Foreign Application Priority Data

Jun. 10, 1998 (EP) ............................................ 98201939
Mar. 15, 1999 (EP) ............................................ 99200777

(51) Int. Cl.⁷ .............................................. G11B 21/08
(52) U.S. Cl. .................. 369/30.04; 369/275.3
(58) Field of Search ........................ 369/30.04, 275.3, 369/30.07, 30.08, 30.09, 47.15; 386/125, 126; 707/200, 1, 205

(56) References Cited

U.S. PATENT DOCUMENTS

| | | | | |
|---|---|---|---|---|
| 6,072,759 A | * | 6/2000 | Maeda et al. ................ | 369/59 |
| 6,353,580 B1 | * | 3/2002 | Mons .......................... | 369/32 |
| 6,370,090 B1 | * | 4/2002 | Verbakel et al. ......... | 369/30.04 |
| 6,377,518 B1 | * | 4/2002 | Auwens et al. .......... | 369/30.04 |

FOREIGN PATENT DOCUMENTS

| | | |
|---|---|---|
| EP | 0402973 A1 | 12/1990 |
| WO | WO9816014 | 4/1998 |
| WO | WO9820488 | 5/1998 |

OTHER PUBLICATIONS

A Method And Device For Storing Audio–Centered Information By a Table–Of–Content Mechanism And Also By a File–Based Access Mechanism Through A Root Directory . . . ( WO 99/28911, MONS ).*

A Method And device For Storing Audio–Centered Information With A Multi–Level Table–Of–Content Mechanism And Doubling Of Area–TOCS ( WO 99/65035 ).*

A Method For Storing Audio–Centered Information With A Multi–Level Table–Of–Content Mechanism With One Master TOC And Sub TOCS For . . . (WO 99/28910 ).*

J.J. Van Der Kam, "A Digital Decimating Filter For Analog–to–Digital Conversion of Hi–Fi Audio Signals", Philips Techn. Rev. 42, No. 6/7, Apr. 1986, pp. 230–238.

Kirk C.H. Chao et al, "A Higher Order Topology for Interpolative Modulators for Oversampling A/D Converters", IEEE TR. on Circuits and Systems, vol. 37, No. 3, Mar. 1990, pp. 309–318.

Research Disclosure No. 36411, Aug. 1994, p. 412–413.

"A Digital Decimating Filter for Analog–to–Digital Conversion of Hi–Fi Audio Signals", J.J. Van Der Kam, Philips Tech., Rev. 42, No. 6/7, Apr. 1986, pp. 230–238.

"A Higher Order Topology for Interpolative Modulators for Oversampling A/D Converters", Kirk. C.H. Chao et al, IEEE Tr. on Circuits and System, vol. 37, No. 3, Mar. 1990, pp. 309–318.

Research Disclosure No. 36411, Aug. 1994, pp. 412–413.

* cited by examiner

*Primary Examiner*—Tan Dinh
(74) *Attorney, Agent, or Firm*—Russell Gross

(57) ABSTRACT

Audio-centered information is stored on a unitary storage medium through a Table-of-Contents (TOC) mechanism that specifies an actual configuration of various audio items. In particular, in addition to the TOC mechanism a file-based access mechanism is assigned to the audio-centered information by a higher level Audio file. At a next-lower level a mechanism is assigned separately as one or more track-wise organized files indicating exclusively audio items contained in the area, and separately therefrom a comprehensive file indicating audio tracks as well as interposed pause intervals.

5 Claims, 3 Drawing Sheets

METHOD FOR STORING AUDIO-CENTERED INFORMATION

A method for storing audio-centered information by a higher level Audio file and at a lower level by one or more track-wise files indicating exclusively audio items, and separately therefrom by a comprehensive file indicating audio tracks and interposed pause intervals, a device for reading and/or storing such information, and a unitary record carrier containing information produced by the method.

BACKGROUND OF THE INVENTION

The invention relates to a method as recited in the preamble of claim 1. Digital audio storage on unitary media such as disc or tape has become widespread. If the audio is sub-divided into multiple sub-items, a Table-of-Contents (TOC) will allow accessing the information in a relatively fast manner. Generally, a TOC specifies at least what has been stored and where it has been stored, for facilitating access in a home-type player. Such audio signals may be used in an environment of personal computers and the like, applying various extended features. An audio provider may wish to have the information readily accessible on platforms of various levels of complexity.

SUMMARY TO THE INVENTION

In consequence, amongst other things, it is an object of the present invention to allow various types of efficient audio management that provides compatible accessibility to players as well as to PC's. Now therefore, according to one of its aspects the invention is characterized according to the characterizing part of claim 1. Through the latter's file structure, the pauses between audio tracks are also incorporated. A computer accessing single tracks may do this now by not only addressing the audio proper via the track files, but alternatively via the comprehensive file. The invention also relates to a unitary storage medium produced by the method and to a storing or reading device arranged for interfacing with such storage medium. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1A:
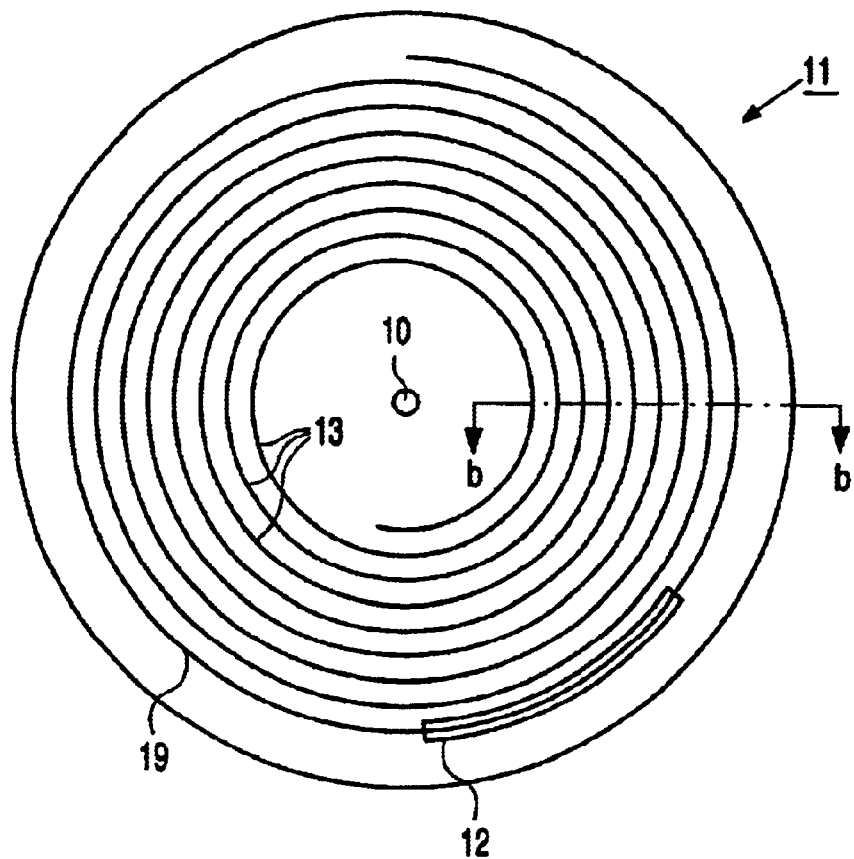
FIGS. 1a, 1b, a record carrier.

FIG. 1a shows a disc-shaped record carrier 11 with central hole 10 and physical track 19 arranged in a spiral pattern of turns to form substantially parallel structures on an information layer. The carrier may be an optical disc with a recordable or a prerecorded information layer. CD-R, CD-RW, and DVD-RAM are recordable; audio CD is prerecorded. Prerecorded discs can be manufactured by first recording a master disc and later pressing copies. Physical Track 19 is indicated by a pre-embossed physical structure. The physical track may have pregroove 14 to allow a read/write head to follow it while scanning. The information is recorded on the information layer by optically detectable marks along the physical track, e.g. pits and lands.

Figure 1B:
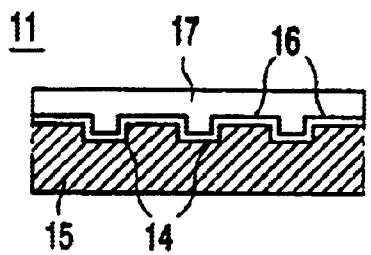

FIG. 1b is a cross-section along the line b—b of a recordable carrier 11, wherein transparent substrate 15 carries recording layer 16 and protective layer 17. Pregroove 14 may be effected as an indentation, an elevation, or as a material property deviating from its surroundings.

For user convenience, the audio information on the carrier has been subdivided into items that often have a duration of a few minutes, e.g. songs of an album or movements of a symphony; hereinafter, these will be called (logical) tracks, in contradistinction to the physical track of FIG. 1. The carrier will often contain access information for identifying the items, such as a Table Of Contents (TOC) included in a file system like ISO 9660 for CD-ROM. The access information may include playing time, start address and song title for each item.

The audio information is recorded in digital representation after analog to digital conversion. Examples of A/D conversion are PCM 16-bit per sample at 44.1 kHz known from CD audio and 1 bit Sigma Delta modulation at a high oversampling rate e.g. 64 xFs called Bitstream. The latter, high quality, method allows to choose between high quality decoding and low quality decoding. Reference therefor is had to the publications 'A digital decimating filter for analog-to-digital conversion of hi-fi audio signals', by J. J. van der Kam, document D5 infra, and 'A higher order topology for interpolative modulators for oversampling A/D converters', by Kirk C. H. Chao et al, document D6. After A/D conversion, digital audio may be compressed to variable bitrate audio data for recording. The compressed audio data will be read from the carrier at such a speed, that after decompression substantially the original timescale is restored when reproducing the audio information continuously. Hence the compressed data must be retrieved from the carrier at a speed dependent on the varying bitrate. The data is retrieved from the record carrier at so-called transfer speed, i.e. the speed of transferring data bytes from the carrier to a de-compressor. The record carrier may have a constant spatial data density to give the highest data storage density. In such system the transfer speed is proportional to the relative linear speed between the medium and the read/write head.

Figure 2:
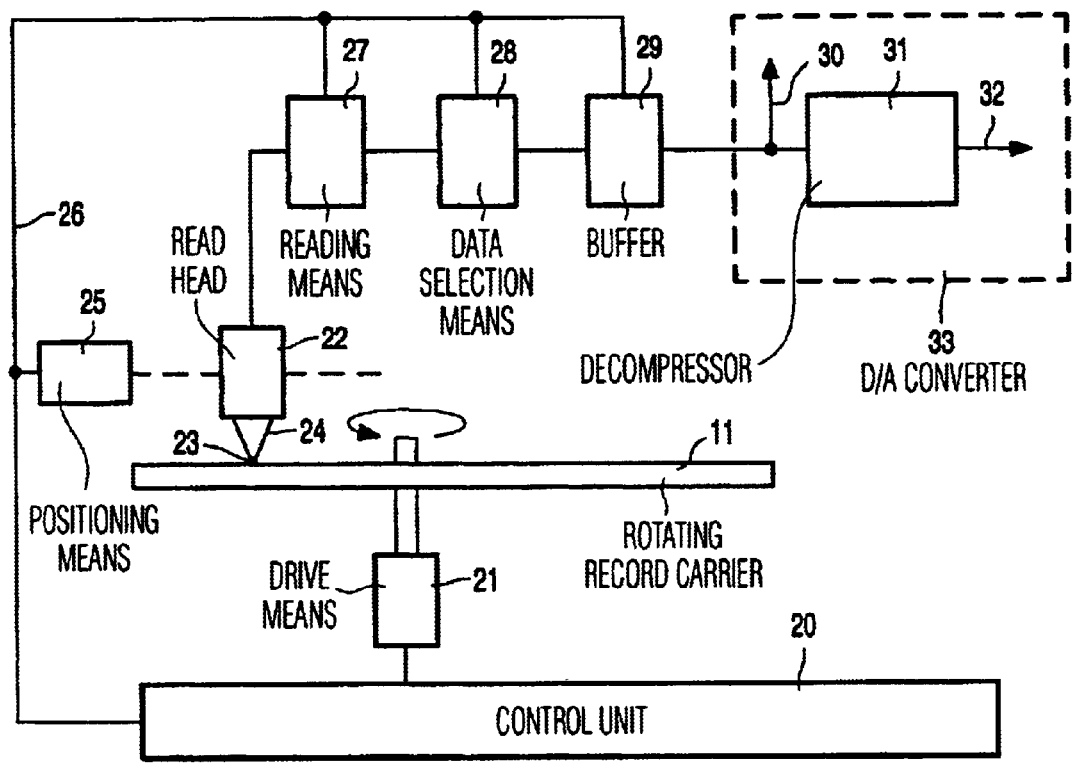
FIG. 2, a playback device.

FIG. 2 shows a playback device for reading carrier 11 of the type shown in FIG. 1. The device has drive means 21 for rotating carrier 11 and read head 22 for scanning the physical track. Positioning means effect 25 coarse radial positioning of read head 22. The read head comprises a known optical system with a radiation source for generating beam 24 that is guided through optical elements and focused on spot 23 on an information layer. The read head further comprises a focusing actuator for moving the focus of the radiation 24 along the optical axis of the beam and a tracking actuator for fine positioning of spot 23 in a radial direction on the centre of the physical track. This actuator may comprise coils to move an optical element or may be arranged to change the angle of a reflecting element. The radiation reflected by the information layer is detected by a known detector in the read head 22, e.g. a four-quadrant diode, to generate a read signal and further detector signals, including tracking error and focusing error signals for the tracking and focusing actuators, respectively. To retrieve the data, the read signal is processed by reading means 27 that may comprise a channel demodulator and an error corrector. The retrieved data is sent to data selection means 28 to select the compressed audio data to feed buffer 29. The selection is based on data type indicators also recorded on the carrier, e.g. headers in a framed format. From buffer 29, the compressed audio data are sent to de-compressor 31 as signal 30. This signal may also be outputted to an external de-compressor. De-compressor 31 from the compressed audio data reproduces the original audio information on output 32. The de-compressor may be located in a stand-alone high quality audio digital to analog convertor 33 in FIG. 2. Alternatively, the buffer may be located before the data selection means. Buffer 29 may be positioned in a separate housing or may be combined with a buffer in the decompressor. The device furthermore has control unit 20 for receiving control commands from a user or from a host computer not shown, and via control lines 26 is connected to drive means 21, positioning means 25, reading means 27 and data selection means 28, and possibly also to buffer 29 for filling level control. To this end, the control unit 20 may comprise digital control circuitry.

The art of audio compression and de-compression is known. After digitizing, audio may be compressed by analyzing the correlation in the signal, and producing parameters for fragments of a specified size. During de-compression the inverse process is used to reconstruct the original signal. If the original digitized signal is reconstructed exactly, the (de)-compression is loss-less, whereas lossy (de)-compression will not reproduce some details of the original signal that however are substantially undetectable to the human ear or eye. Most known systems for audio and video, such as MPEG, use lossy compression, but loss-less compression is used for computer data. Examples of audio (de)-compression may be found in D2, D3 and D4 hereinafter.

Data selection means 28 will retrieve from the data read control information indicating the transfer speed profile, and further will discard any stuffing data, that had been added during recording according to the speed profile. When control unit 20 must reproduce an audio item from the carrier, positioning means 25 will position the reading head on the portion of the track containing the TOC. The starting address and the speed profile for that item will then be retrieved from the TOC via the data selection means 28. Alternatively, the contents of the TOC are read only once and stored in a memory when the disc is inserted in the apparatus. For reproducing the item, the drive means 21 will rotate the record carrier at the speed indicated by the speed profile. The required rotation rate may be denoted as such in the speed profile for setting the drive means. Alternatively the speed profile may comprise a bitrate, and then the rotation rate can be calculated from the radial position of the item as based on the starting address, because the record carrier density parameters, like track pitch and bit length, are predetermined and known to the playback device, usually from a standard. Next, the rotation rate can be derived from the bitrate and said radial position.

To provide continuous reproduction without buffer underflow or overflow, the transfer speed is coupled to the reproduction speed of the D/A converter, i.e. to the bitrate after decompression. The apparatus may thereto comprise a reference frequency source to control the decompressor and the rotation rate may be set in dependence of reference frequency and speed profile. The rotation rate may also be adjusted using the average filling level of the buffer 29, e.g. decreasing the rotation rate if the buffer is more than 50% full on average.

Figure 3:
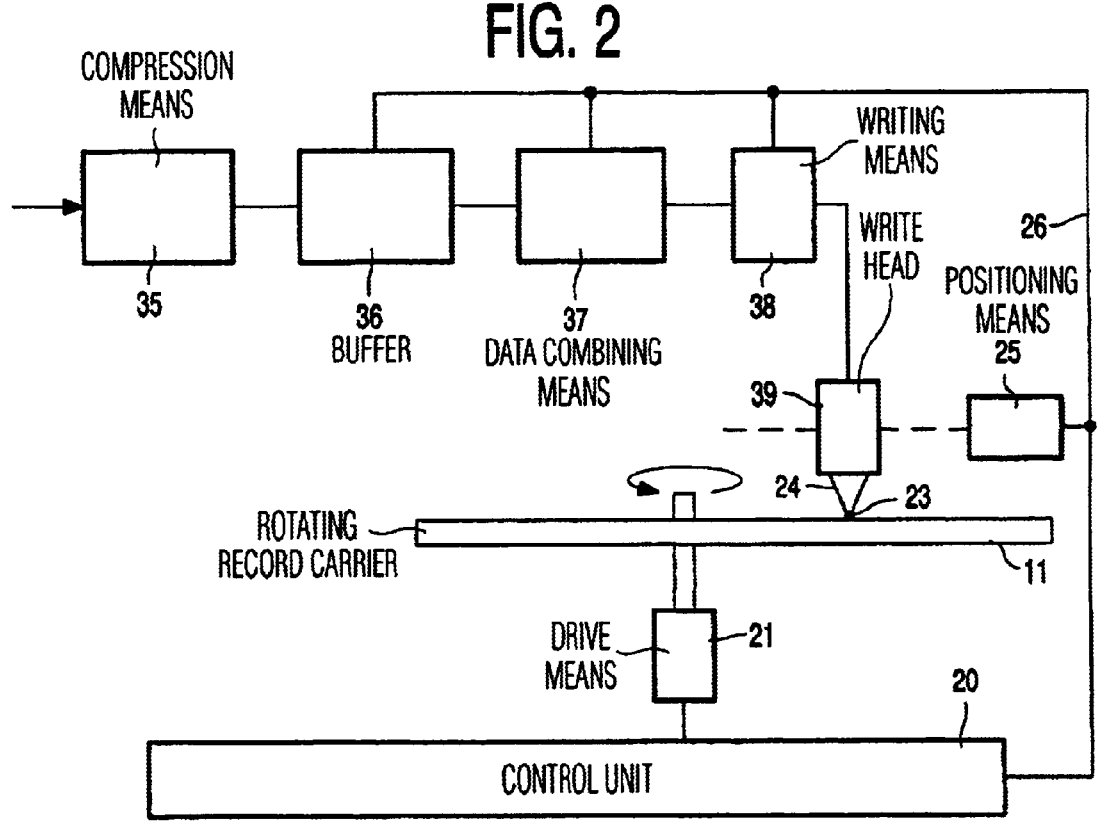
FIG. 3, a recording device.

FIG. 3 shows a recording device for writing information on a carrier 11 of a type that is (re)writable. During writing, marks representing the information are formed on the record carrier. The marks may be in any optically readable form, e.g. in the form of areas whose reflection coefficient differs from their surroundings, through recording in materials such as dye, alloy or phase change, or as areas with a different magnetization direction from their surroundings. Writing and reading information for recording on optical disks and usable rules for formatting, error correcting and channel coding, are well-known, e.g. from the CD system. Marks may be formed through a spot 23 generated on the recording layer via a beam 24 of electromagnetic laser radiation. The recording device comprises similar basic elements as described with reference to FIG. 2, i.e. control unit 20, drive means 21 and positioning means 25, but it has a distinctive write head 39. Audio information is presented on the input of compression means 35, which may be placed in a separate housing. Suitable compression has been described in D2, D3 and D4. The variable bitrate compressed audio on the output of compression means 35 is sent to buffer 36. From buffer 36 the data is sent to combining means 37 for adding stuffing data and further control data. The total data stream is passed to writing means 38 for recording. Write head 39 is fed by writing means 38 that may comprise a formatter, an error encoder and a channel modulator. The data presented to the input of writing means 38 are distributed over logical and physical sectors according to formatting and encoding rules and converted into a write signal for the write head 39. Unit 20 is arranged to control buffer 36, data combination means 37 and writing means 38 via control lines 26 and for executing the positioning procedure as described above for the reading apparatus. The recording apparatus may also allow reading by having the features of a playback apparatus and a combined write/read head.

Figure 4:
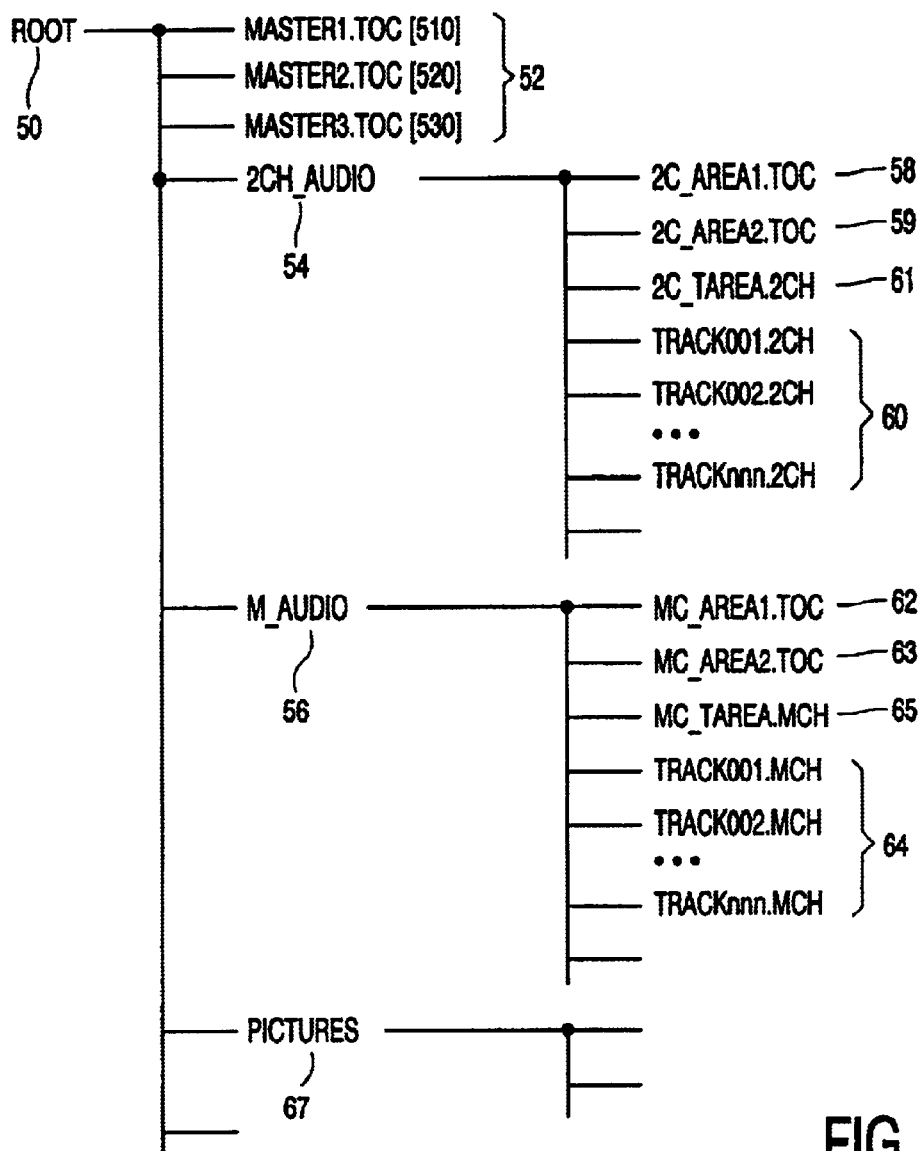
FIG. 4, a file system for use with the invention.

FIG. 4 shows a file system for use with the invention, for which in principle various different options are feasible. Preferably, the storage medium should be based on the UDF or on the ISO 9660 file system. In an alternative case no file system would be present, and all relevant sector spaces should be kept empty.

If a file system is present however, all audio will be stored in Audio Files located in SubDirectory SCD_AUDIO. FIG. 4 shows the hierarchy to be based on ROOT file 50 pointing to various subaltern files 52, 54, 56, 67. The structure of mutually identical MASTER.TOCs 52 will be discussed hereinafter. Furthermore, there is a 2C_AUDIO file 54. This points to mutually identical Area TOCs 2C_AREA1/2.TOC 58, 59, in parallel therewith to the various stereo tracks TRACKn.2CH 60, and also to Area file 2C_TAREA.2CH 61. Further, there is MC_AUDIO file 56. This points to mutually identical TOCs MC.TOC 62, 63, in parallel therewith to the various multi-channel tracks TRACKn.MCH 64, and also to Area file MC_TAREA.MCH 65. In consequence, the tracks may be accessed either via the associated TOCs, or via a file system that has TOC and sub-TOCS as directories. The files 60, 64 each refer only to the audio of the associated tracks, but files 61, 65 point to the pause intervals of the associated tracks as well, as will be disclosed with reference to FIG. 6 hereinafter. Finally, file item 67 may indicate stored pictorial information.

Figure 5:
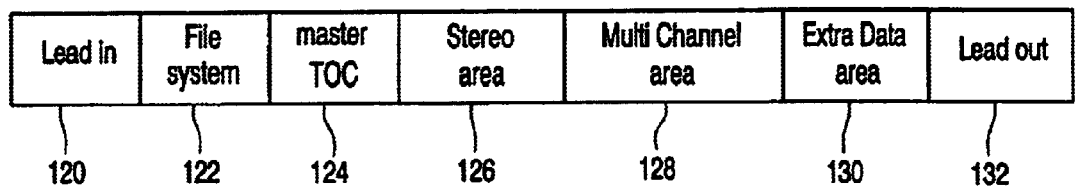
FIG. 5, a storage arrangement for the invention.

FIG. 5 shows an exemplary storage arrangement for use with the invention, which has been shown as a single serial representation. Along the horizontal axis, the following items are evident. Item 120 is a Lead-in that is used for mutually synchronizing a reader and the driving of the medium. File System 122 represents what has been disclosed with respect to FIG. 4. MASTER TOC item 124 may be configured along standard procedures and pertains to subsequent items Stereo Area 126, and Multi-channel Audio Item 128, and if necessary also to Extra Data Item 130. The lengths of these three areas need not be standardized, because various different amounts of information may be present. With respect to the audio areas, the audio track areas proper, as well as the associated SUB_TOCs are included. Apart from the disclosure hereinafter, the contents of items 126, 128, 130 may be defined according to conventional standards that by themselves do not constitute part of the invention. generally, the two audio areas may have the same structure, and contain the same kinds of information, apart from having distinguishing definitions for the various channels. The audio may be plain coded or loss-less coded. All kinds of audio may be multiplexed with supplementary data, such as Compact Disc Text.

Item 130 represents Extra Data Information that may be defined in a conventional standard. Lead-Out Information 132 is in particular used for search operations. Its tracks do not contain other information than track numbers and addresses. The number of lead-out tracks may cover a ring of some 0.5 to 1 millimeter wide. According to the above, the stored information may be accessed either via the file system as laid down in item 122 or via the TOC structure laid down in item 124.

Any of the single or plural Master TOCs 124 will starts at respective uniformly standardized offset position from the start of the Lead-in area, such as byte number 500 for the first Master TOC. In the embodiment, a Master-TOC measures only one standard-size sector and primarily contains pointers to the various Sub-TOCs or Area-TOCs to be disclosed hereinafter. A preferred syntax of the Master-TOC is as follows:

1. A 16-byte Signature identifies a Master-TOC, such as by "SACD Master TOC". The signature contains three space characters; the apostrophes are not part of the definition.
2. A 2-byte Spec-version indicates the version number of the format used in the disc.
3. A 14-byte Space has been reserved, such as for alignment stuffing.
4. A 4-byte integer 2CH-start_address contains the logical address of the first sector of the stereo area.
5. A 4-byte integer 2CH-end_address contains the logical address of the last sector of the stereo area.
6. A 4-byte integer MC-start_address contains the logical address of the first sector of the Multi channel area.
7. A 4-byte integer MC-end_address contains the logical address of the last sector of the Multi channel area.
8. A 4-byte integer Extra_data_start_address contains the logical address of the first sector of the Extra Data area.
9. A 4-byte integer Extra_data_end_address contains the logical address of the last sector of the Extra Data area.

The information for the above totals 56 bytes. Extra features may be added to the Master-TOC. If a certain area is absent, the associated start and end addresses have value zero.

Next, items 126 and 128 will contain Sub-TOCS or Area-TOCs for the Stereo and Multi-Channel Audio intervals, respectively. A preferred syntax of a Sub-TOC is as follows:

1. A 16-byte Signature identifies the Sub-TOC in question such as by "SACD stereo TOC" for a stereo audio area and "SACD MC TOC" for a Multi Channel audio area, the number of bytes being attained by adding trailing space characters.
2. A 2-byte Spec_version indicates the version number of the format used in the disc.
3. A 4-byte Sub_TOC_length indicates the number of bytes present in the actual TOC.
4. A 10-byte Space may be reserved for alignment stuffing.
5. A variable size set of /*Disc Parameters*/ may be given, such as a Name of an Album( ) and a Name of a Catalogue( ).
6. A 4-byte disc_play_time indicates the total linear playing time of the disc expressed as a time code.
7. A 4-byte disc_name_pointer indicates the offset in bytes from the start of the Sub_TOC in question to the start of the disc_name( ) field. If this value is 0, it indicates that the disc_name( ) field is absent.
8. A 4-byte disc_date_pointer indicates the offset in bytes from the start of the Sub_TOC in question to the start of the disc_date( ) field. If this value is 0, it indicates that the disc_date( ) field is absent.
9. A 4-byte disc_copyright_pointer indicates the offset in bytes from the start of the Sub_TOC in question to the start of the disc_copyright( ) field. This value may be 0, to indicate that the disc_copyright( ) field is absent.
10. A 4-byte disc_publisher_pointer indicates the offset in bytes from the start of the Sub_TOC in question to the start of the disc_publisher( ) field. This value may be 0 to indicate that the disc_publisher( ) field is absent.
11. A variable size Track_List( ) may for each one of a plurality of audio tracks contain offset information to the start of the TOC in question, plus various further items that may be interesting to a listener, such as the name of track.

A Track_List_1 contains:

12. An 8-byte Track_List_1_Signature identifying the sector with Track_List_1.
13. A 4-byte Track_Start_Address (tno) for all audio tracks with tracknumber tno in the current Audio Area containing the logical address of the first sector of the track.
14. A 4-byte Track length (tno) for all audio tracks with tracknumber tno in the current Audio Area containing the length in sectors of the track.

A Track_List_2 contains:

15. An 8-byte Track_List_2_Signature identifying the sector with Track_List_2.
16. A Track_Start_Time_Code (tno) for all audio tracks with tracknumber tno giving the start Time_Code of the track.
17. A Track_Time Length (tno) for all audio tracks with tracknumber tno giving the playing time of the track.

Figure 6:
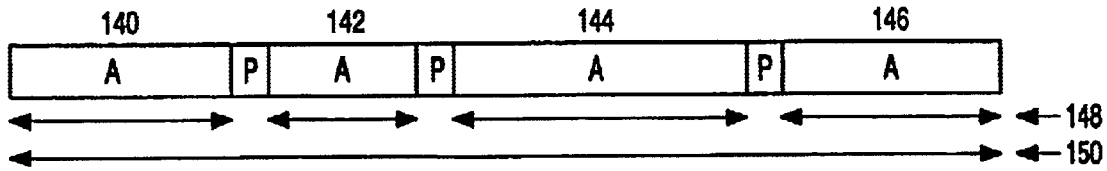
FIG. 6, a detailed track organization.

FIG. 6 gives a detailed track organization, in particular, regarding the two categories of files 60, 64, versus 61, 65. Now in this example, the storage area contains four audio tracks 140, 142, 144, 146. Each track contains an amount A of audio information that may be of non-uniform lengths. Furthermore each pair of successive audio intervals is separated by a pause interval, labeled P. The lengths of the pauses have been set by a developer of the record carrier, and may have been chosen with reference to the particular character of the foregoing track and/or the next-following track. The lengths may depend on various considerations, such as the respective loudnesses, beat frequencies, correspondence or differences in character, composer, and style, and need not be uniform for a particular carrier. A zero-length pause is feasible in principle. The last track will generally not have a succeeding pause interval.

For each track A, the start location length and other information is given in the Area-TOC of the Audio Area where the track belongs to. The storage area of the tracks A and the pause intervals P, as represented in FIG. 6 by indication 148, contains a Time_Code. The Time_Code starts with zero at the start of the pause interval P. The Time_Code increments in steps of 1/75 seconds to the end of the storage are 148. A time unit of 1/75 second is called a frame. The Time_Code is encoded in multiplexed frames. All tracks A as well as all pause intervals P in the storage area 148 are consecutively numbered starting with one.

Now, for accessing only a single separated track, such as for computer processing, or playing in an arbitrary order, usually only the audio proper will be relevant. In such situation, reproduction may forego the pauses or set them in an independent manner. In consequence, files 60, 64 in FIG. 4 will exclusively point to the associated track audio parts taken in isolation. Such has in FIG. 6 been represented by indication 148, that covers exclusively audio. On the other hand, another mode of use is to play the area sector-by-sector. This may in principle be done without reference to any file system at all. The inventors have however recognized that for reasons of consistence, a file system would be appropriate, but should not overlook pauses for esthetic or other perceptive arguments. Therefore, a separate file has been assigned to the area as a whole, inclusive of the pauses, which has been symbolized by the additional indication 150, and included in items 61, 65 in FIG. 4. The associated Area TOC will indicate the sizes of the pauses in question, and where the next audio track is beginning. The foregoing means that accessing of the audio is straightforward, using either the track files, or alternatively, the comprehensive file and the associated sub-TOCs.

List of Related Documents (D1) Research Disclosure No. 36411, August 1994, p. 412–413.
(D2) PCT/IB97/01156 (PHN 16.452), 1 bit ADC and lossless compression of audio
(D3) PCT/IB97/01303 (PHN 16.405), Audio compressor
(D4) EP-A 402,973 (PHN 13.241), Audio compression
(D5) J.J. van der Kam 'A digital decimating filter for analog-to-digital conversion of hi-fi audio signals', Philips Techn. Rev. 42, No 6/7, April 1986, pp. 230–8.
(D6) Kirk C.H. Chao et al, 'A higher order topology for interpolative modulators for oversampling A/D converters', IEEE Tr. on Circuits and Systems, Vol 37, No 3, March 1990, pp. 309–18.

What is claimed is:

1. A method for storing audio-centered information on a unitary storage medium through a Table-of-Contents (TOC) mechanism for therein specifying an actual configuration of various audio items on said medium, assigning in addition to the TOC mechanism a file-based access mechanism to the audio-centered information through a higher level Audio file, and at a next-lower level through a mechanism assigning to a particular audio area separately one or more files organized according to logical tracks and indicating exclusively audio items contained in track, and separately therefrom assigning a comprehensive file indicating audio items contained in tracks and indicating interposed pause intervals between the latter tracks.

2. A method as claimed in claim 1, whilst employing in combination with the comprehensive file, an associated Table-of-Content (TOC) to indicate the sizes of the pauses.

3. A method as claimed in claim 2, whilst furthermore providing separate said comprehensive files, with respect to two-channel audio and with respect to multi-channel audio, respectively.

4. A unitary medium for storing audio-centered information, comprising:

a Table-of-Contents (TOC) mechanism for specifying an actual configuration of various audio items on said medium;

a file-based access mechanism for the audio-centered information through a higher level Audio file;

one or more files at a next-lower level assigned to a particular audio areas, the one or more files organized according to logical tracks and indicating exclusively audio items contained in a track, a comprehensive file indicating audio items contained in tracks and indicating interposed pause intervals between the latter tracks.

5. A medium as claimed in claim 4 and executed as an optically readable disc.

* * * * *